US011313508B2

(12) United States Patent
Gallagher (10) Patent No.: US 11,313,508 B2
(45) Date of Patent: Apr. 26, 2022

(54) RADIAL POSITIONING DEVICE

(71) Applicant: Raytheon Company, Waltham, MA (US)

(72) Inventor: Jeffery M. Gallagher, Anna, TX (US)

(73) Assignee: Raytheon Company, Waltham, MA (US)

( * ) Notice: Subject to any disclaimer, the term of this patent is extended or adjusted under 35 U.S.C. 154(b) by 61 days.

(21) Appl. No.: 16/560,746

(22) Filed: Sep. 4, 2019

(65) Prior Publication Data

US 2021/0062961 A1  Mar. 4, 2021

(51) Int. Cl.
*F16C 25/04* (2006.01)
*F16M 11/10* (2006.01)
*F16C 35/02* (2006.01)
*F16C 35/07* (2006.01)
*G02B 7/182* (2021.01)

(52) U.S. Cl.
CPC ............ *F16M 11/10* (2013.01); *F16C 25/04* (2013.01); *F16C 35/02* (2013.01); *F16C 35/07* (2013.01); *G02B 7/1827* (2013.01)

(58) Field of Classification Search
CPC ........ F16B 21/183; F16C 23/04; F16C 25/04; F16C 27/06; F16C 35/07; F16C 35/02
See application file for complete search history.

(56) References Cited

U.S. PATENT DOCUMENTS

| | | | |
|---|---|---|---|
| 1,817,160 A * | 8/1931 | Morison ................ | F16C 17/03 384/216 |
| 2,491,306 A * | 12/1949 | Feitl ..................... | F16B 21/186 411/518 |
| 4,268,123 A | 5/1981 | Mesco | |
| 4,726,671 A | 2/1988 | Ahmad et al. | |
| 4,929,073 A | 5/1990 | La Plante et al. | |
| 5,488,514 A | 1/1996 | Bruning et al. | |
| 5,538,257 A * | 7/1996 | Sandgren ............. | F16D 1/08 277/379 |

(Continued)

FOREIGN PATENT DOCUMENTS

| | | | |
|---|---|---|---|
| CN | 102508347 A | 6/2012 | |
| DE | 3701870 A1 * | 8/1988 | ............ F16C 35/063 |

(Continued)

OTHER PUBLICATIONS

International Search Report for International Application No. PCT/US2020/040780 dated Oct. 12, 2020, 27 pages.

*Primary Examiner* — Bradley Duckworth (57) ABSTRACT

A radial positioning device is disclosed. The radial positioning device can include a body. The body can include a circumferential surface having a spring location and at least one interface portion operable to interface with a mating component. The body can also have a recess with a depth that varies relative to the circumferential surface about the body. The radial positioning device can also include a spring disposed in the recess. The spring can have a radial dimension greater than the depth of the recess at the spring location. The spring can be operable to contact the mating component at the spring location and compress in the radial dimension to provide a spring force that biases the at least one interface portion and the mating component against one another.

17 Claims, 5 Drawing Sheets

(56) References Cited

U.S. PATENT DOCUMENTS

| | | | |
|---|---|---|---|
| 5,601,387 A * | 2/1997 | Sanford | B25B 23/0064 |
| | | | 408/113 |
| 6,848,828 B2 * | 2/2005 | Nishijima | F16C 27/02 |
| | | | 384/106 |
| 7,903,353 B2 | 3/2011 | Reichmann et al. | |
| 8,485,752 B2 * | 7/2013 | Slayne | F16C 25/04 |
| | | | 403/372 |
| 9,703,069 B2 | 7/2017 | Sato | |
| 9,816,519 B2 * | 11/2017 | Nowitzki | F04D 29/046 |
| 9,969,239 B2 * | 5/2018 | Drust | F16F 1/045 |
| 10,048,463 B2 | 8/2018 | Klaffert | |
| 2002/0154730 A1 | 10/2002 | Shiraishi | |
| 2014/0070497 A1 * | 3/2014 | Werdecker | F16J 15/3452 |
| | | | 277/500 |
| 2019/0094705 A1 | 3/2019 | Kugler et al. | |
| 2020/0346681 A1 * | 11/2020 | Sekine | F16C 17/02 |

FOREIGN PATENT DOCUMENTS

| | | |
|---|---|---|
| DE | 3701870 A1 | 8/1988 |
| FR | 2517019 A1 | 5/1983 |
| JP | S54-102444 A | 8/1979 |
| JP | S57-187929 U | 11/1982 |

* cited by examiner

RADIAL POSITIONING DEVICE

BACKGROUND

Certain mechanisms, such as precision mechanisms, may require mating components to be positioned relative to one another in a unique and predictable manner. For example, design requirements may dictate that a shaft and bearing interface with one another in a way that eliminates relative radial movement between the components to provide precise rotational motion. As a result, any gap or "play" (e.g., due to a clearance slip fit) between the shaft and bearing is undesirable. Thus, typically in such cases, a shaft and a bearing may have an interference fit and/or may be secured to one another by an adhesive that can fill any gaps between the components. Some precision mechanisms may include multiple bearing and shaft interfaces, such as bearings located on opposite sides of a rotatable component. For certain applications, thermal conditions and the materials utilized (with respect to coefficients of thermal expansion (CTE)) may result in differential thermal expansion between the rotatable component and its support structure in an axial direction (i.e., parallel to an axis of rotation). In this case, an interference fit and/or adhesive coupling interface between the rotatable component and bearings on opposite sides of the rotatable component may prevent relative axial movement, which can generate stress in the rotatable component and its support structure that can lead to deformation and/or failure of one or more components. To account for differential thermal expansion, a bearing on one side of the rotatable component may be a custom bearing to allow for axial movement or the bearing may be supported by an axially compliant flexure.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

An initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

Although interference fits and/or adhesives may be effective in eliminating relative radial movement between mating components (e.g., a shaft and a bearing), these coupling configurations may increase complexity and difficulty of assembly. In addition, interference fits and/or adhesives can be detrimental in applications where differential thermal expansion is an issue. Although utilizing custom bearings or flexures to accommodate differential thermal may be effective in dealing with thermally induced stress and/or deflection, these approaches can be expensive, large, and may also present difficulties for assembly.

Accordingly, a radial positioning device is disclosed that deterministically locates mating components in a radial direction and also allows relative axial movement between the mating components, which can accommodate differential thermal expansion. In one aspect, the radial positioning device provides a low-cost solution that is easy to assemble. The radial positioning device can include a body. The body can include a circumferential surface having a spring location and at least one interface portion operable to interface with a mating component. The body can also have a recess with a depth that varies relative to the circumferential surface about the body. The radial positioning device can also include a biasing element or member (e.g., a spring) disposed in the recess. The spring can have a radial dimension greater than the depth of the recess at the spring location. The spring can be operable to contact the mating component at the spring location and compress in the radial dimension to provide a spring force that biases the at least one interface portion of the body and the mating component against one another.

A radial positioning system is also disclosed. The radial positioning system can include a component and a radial positioning device operable to couple with the component. The radial positioning device can include a body. The body can include a circumferential surface, which can have a spring location and at least one interface portion operable to interface with the component. The body can also include a recess with a depth that varies relative to the circumferential surface about the body. The second component can also include a spring disposed in the recess. The spring can have a radial dimension greater than the depth of the recess at the spring location. The spring can be operable to contact the component at the spring location and compress in the radial dimension to provide a spring force that biases the at least one interface portion and the component against one another.

Figure 1:
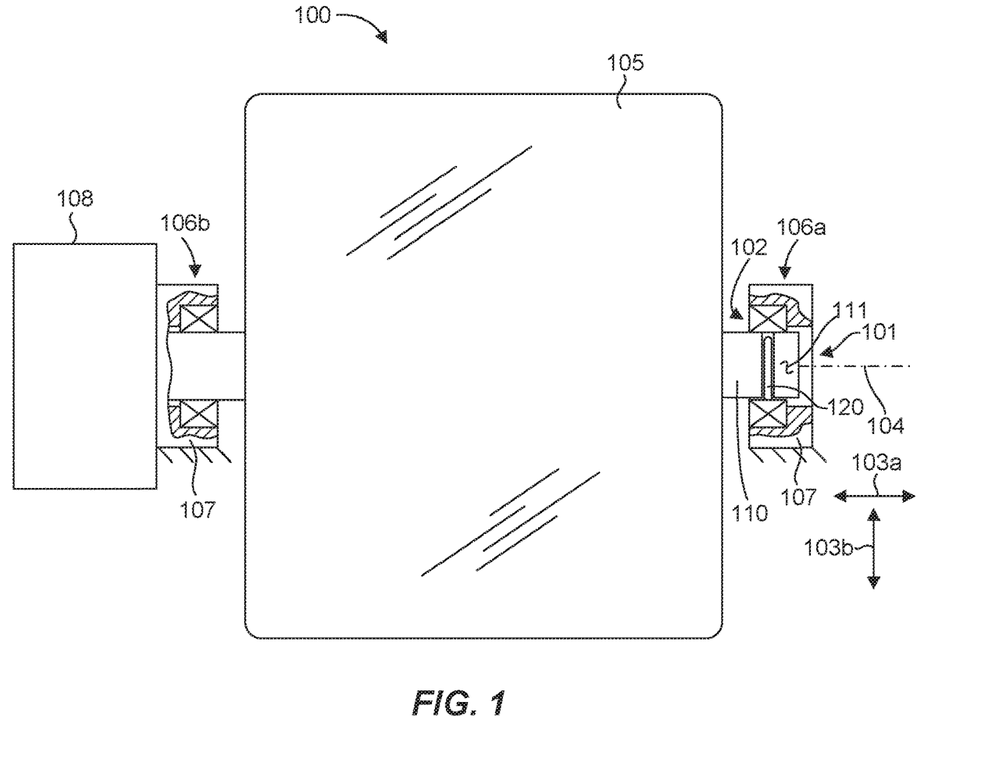
FIG. 1 is an illustration of a radial positioning system in accordance with an example of the present disclosure.
Figure 2:
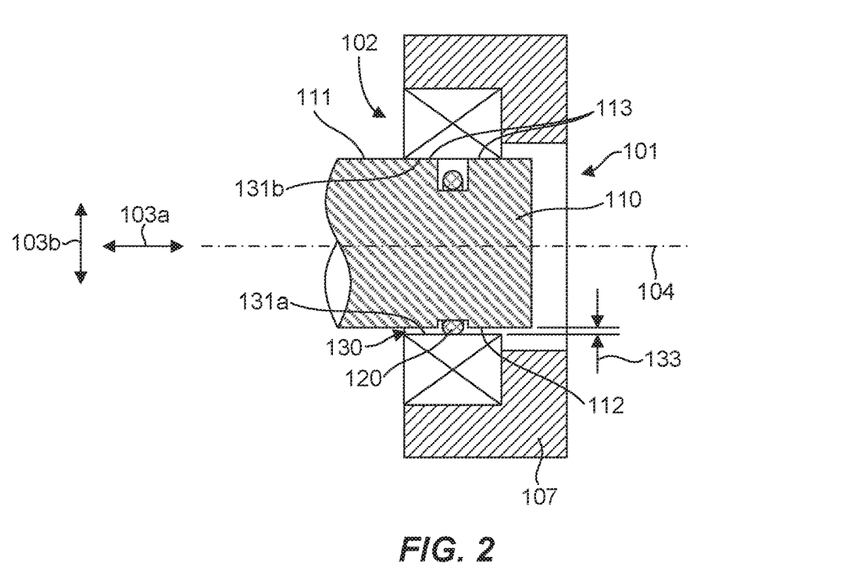
FIG. 2 is a detailed cross-sectional view of a radial positioning device of the radial positioning system of FIG. 1; in accordance with an example of the present disclosure.
Figure 3:
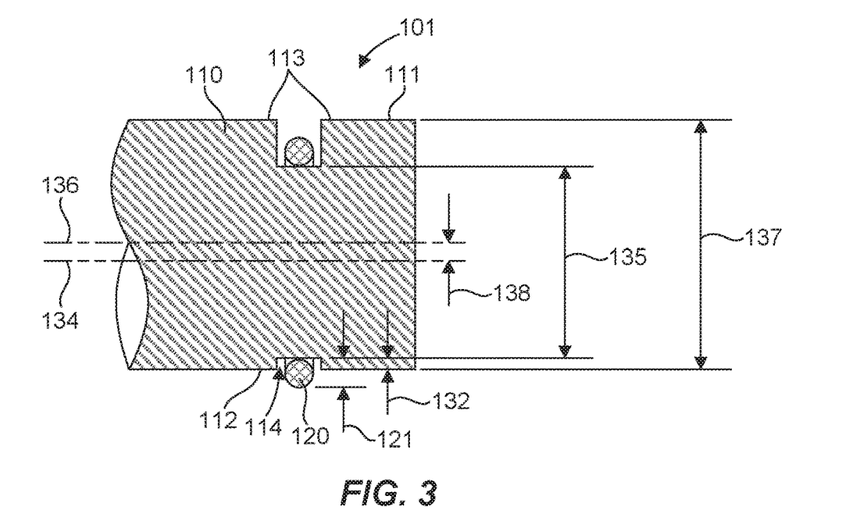
FIG. 3 a cross-sectional side view of the radial positioning device of FIG. 1, shown isolated from other components of the radial positioning system.
Figure 4:
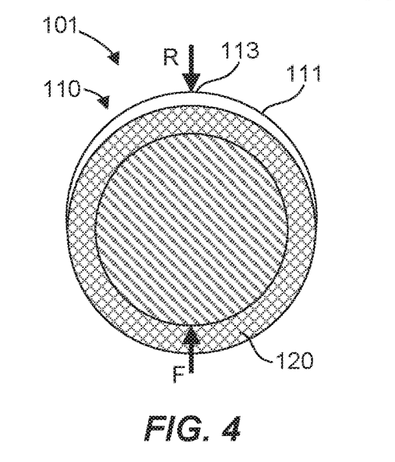
FIG. 4 is a cross-sectional end view of the radial positioning device of FIG. 3.
Figure 5:
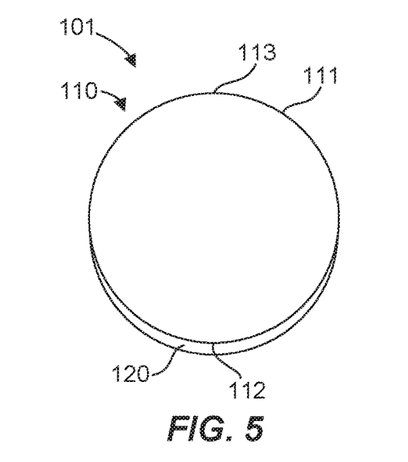
FIG. 5 is an end view of the radial positioning device of FIG. 3.
Figure 6:
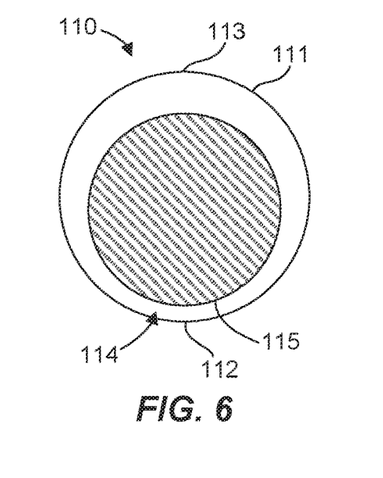
FIG. 6 is a cross-sectional end view of a body of the radial positioning device of FIG. 4.

To further describe the present technology, examples are now provided with reference to the figures. With reference to FIG. 1, one embodiment of a radial positioning system 100 is illustrated. The radial positioning system 100 can comprise a radial positioning device 101 and a mating component 102. The radial positioning device 101 can be operable to couple with the component 102, as described in more detail below. A detailed cross-sectional view of the radial positioning device 101 of the system 100 is shown in FIG. 2. The radial positioning device 101 is shown isolated from the mating component 102 in FIG. 3. Cross-sectional views of various aspects of the radial positioning device 101 are shown in FIGS. 4 and 6. An end view of the radial positioning device 101 is shown in FIG. 5.

In general, the radial positioning device 101 can include a body 110 and a biasing element or member (e.g., see spring 120) operable to radially bias the body 110 and the mating component 102 against one another. Specifically, the body 110 can have a circumferential surface 111, which can have a spring location 112 and at least one interface location or portion 113 (i.e., a part or portion of the surface 111) operable to interface with the mating component 102. In the example illustrated in FIGS. 1-6, the circumferential surface 111 is an outer surface of the body 110, which is configured to fit at least partially within the mating component 102 (e.g., within an opening 130 of the mating component 102). As shown in FIG. 2, the spring 120 can engage an inner surface portion 131a of the mating component 102 and bias or push the body 110 against another (e.g., generally opposite or opposing) inner surface portion 131b of the mating component 102. The opening 130 of the mating component 102 can generally define an axial direction 103a, which is parallel to an axis 104 of the opening 130. A radial direction 103b is any direction orthogonal to the axial direction 103a. The spring 120 can bias the body 110 and the mating component 102 against one another in the radial direction 103b (e.g., force the body 110 upward against the mating component 102 in the FIG. 2 illustration).

In one aspect, the radial positioning device 101 can enable the body 110 to be movable relative to the component 102 in the axial direction 103a. For example, the spring 120 and/or the interface portion 113 can be operable to slide relative to the mating component 102. Such sliding can be facilitated by lubricating the mating component 102, the spring 112, and/or the interface portion 113, which can reduce or minimize interface friction and therefore reduce the axial load generated by relative axial movement.

The ability of the spring 120 and/or the interface portion 113 to slide relative to the mating component 102 can be beneficial in minimizing the negative impact of differential thermal expansion. For example, as shown in FIG. 1, a supported structure 105 can be supported on opposite sides at locations 106a, 106b by a support 107. In this example, the supported structure 105 can be coupled to the support 107 at the location 106b in a manner that prevents or inhibits relative movement in the axial and radial directions 103a, 103b. In other words, the supported structure 105 can be axially and radially fixed relative to the support 107 at the location 106b. On the opposite side of the supported structure 105, the body 110 is associated with the supported structure 105 and the component 102 is associated with the support 107 at the location 106a. Specifically, the interface portion 113 and the spring 112 can interface the radial positioning device 101 with the component 102 at the location 106a. As described herein, the body 110 can be coupled to the component 102 in a manner that prevents or inhibits relative movement in the radial direction 103b, while allowing for relative movement in the axial direction 103a. Thus, the supported structure 105 is radially fixed relative to the support 107 at the locations 106a, 106b, while being axially unconstrained or free to move relative to the support 107 at the location 106a. As a result of this axial freedom of movement between the supported structure 105 and the support 107 at the location 106a provided by the radial positioning device 101, differential thermal expansion/contraction between the supported structure 105 and the support 107 at the locations 106a, 106b can be accommodated, which can minimize or prevent thermally induced stress and/or deflection (e.g., distortion) in the system 100.

In one aspect, shown in FIG. 1, the supported structure 105 can be a rotatable structure that is rotatable relative to the support 107 about the axis 104. For example, with respect to coupling at the location 106a, the body 110 can be or include a shaft, an axle, a trunnion, etc., and the component 102 can be or include a bearing, a bushing, or other suitable interfacing feature for the body 110. Similar structures or features can be included at the location 106b. A radial positioning system as disclosed herein can take many different forms and can be utilized in a variety of applications. In the example illustrated in FIG. 1, for instance, the supported structure 105 can be a mirror, which can be rotated about the axis 104 by a drive motor 108. Such a mirror can be used in satellites or other imaging systems. Still other types of supported structures are contemplated herein.

In one aspect, the radial positioning device 101 can also include a recess 114 or groove (e.g., in the body 110), in which at least a portion of the spring 120 can be disposed. The spring 120 can have a radial dimension 121 greater than a depth 132 of the recess 114 at the spring location 112, as shown in FIG. 3. The spring 120 can be operable to contact the mating component 102 at the spring location 112 and compress in the radial dimension 121 to provide a spring (e.g., preload) force that biases the body 110 (e.g., the interface portion 113) and the mating component 102 against one another. Thus, the spring 120 can be seated in the recess 114 and a portion of the spring 120 proximate the spring location 112 can be compressed during assembly between the body 110 and the mating component 102. Forces acting in the body 110 are illustrated in FIG. 4, which shows a net spring force F applied by the spring 120 on the body 110 that is reacted on the body 110 by a reaction force R where the interface portion 113 contacts the mating component 102.

Figure 7A:
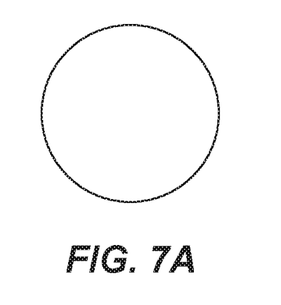
FIGS. 7A-7F illustrate cross-sectional spring shapes in accordance with several examples of the present disclosure.
Figure 7B:
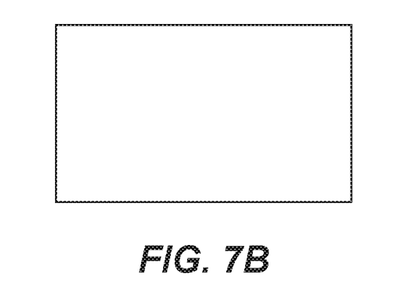
Figure 7C:
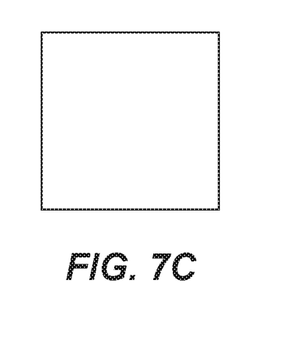
Figure 7D:
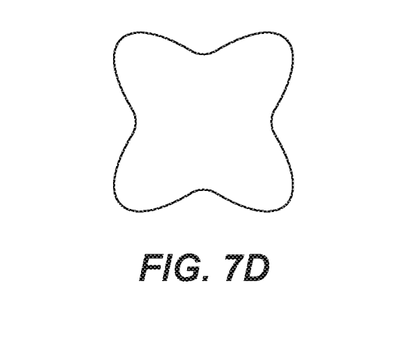
Figure 7E:
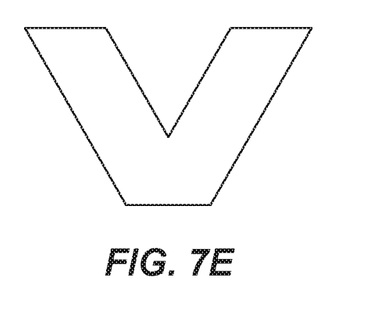
Figure 7F:
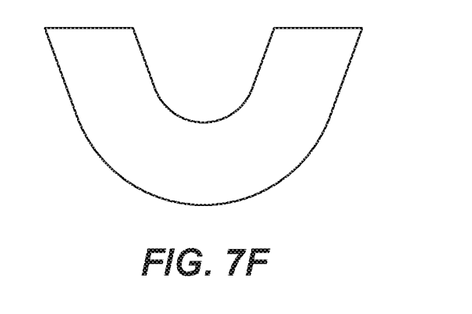

The spring 120 can be any suitable type of spring. In one aspect, the spring 120 can be operable to extend about a circumference of the body 110 (e.g., within the recess 114), which can serve to couple the spring 120 to the body 110. The spring 120 can be constructed of any suitable material (e.g., an elastomer and/or a metal) and can have any suitable configuration, such as a circular spring, a circumferential spring, a toroidal spring, a garter spring, a coil spring (e.g., a circumferential coil spring), a meander spring, a cantilever spring, a radial spring, and/or a sealing ring (e.g., an O-ring), as known in the art. Example cross-sectional spring shapes or profiles are shown in FIGS. 7A-7F. For example, the spring 120 can have a cross-sectional shape of a circle (FIG. 7A), a rectangle (FIG. 7B), a square (FIG. 7C), an X-shape (FIG. 7D, also referred to as a quad ring or Q-lobe), a V-shape (FIG. 7E), and/or a U-shape (FIG. 7F). The cross-sectional shape of the spring 120 can be at any suitable orientation with respect to the body 110 and the mating component 102. Thus, for example, the V-shape or U-shape can be in an "upright" orientation relative to the body 110, as illustrated in FIGS. 7E and 7F, or oriented on a side (e.g., rotated 90 degrees with respect to the illustrated orientation) for a V-Spring or a U-Spring profile (e.g., of a meander or cantilever spring). In one example, the spring 120 can have a radially oriented wave configuration (e.g., a wave spring), In addition, although the spring 120 may be illustrated as a spring having a circular cross-section (e.g., a torus such as an O-ring), it should be recognized that the spring 120 can be of any suitable type and material, having any suitable configuration in accordance with the principles disclosed herein.

In one aspect, the body 110 can be configured to be eccentrically located (i.e., off center) with respect to the mating component 102 as biased by the spring 120, For example, as shown in FIG. 2, a diametral gap 133 between the body 110 and the mating component 102 can be created on one side of the body 110 between the spring portion 112 and the mating component 102 where the spring 120 interacts with the mating component 102 and exerts a spring force that biases the spring portion 112 away from the mating component 102. The interface portion 113 can be urged against the mating component 102 by the spring force F, which is reacted by the mating component 102 with reaction force R against the interface portion 113, as shown in FIG. 4. In one aspect, the spring 120 can be configured to generate a radial force or pressure between the body 110 and the mating component 102 in a local region (e.g., in the recess 114 proximate the spring portion 112), which can be represented as the biasing force F acting on the body 110. The spring 120 can therefore serve to remove any "slop" or "play" in the fit between the body 110 and the mating component 102.

The recess depth 132 can be configured to be less than a thickness or radial dimension 121 of the spring 120 by an amount at least sufficient to enable deflection or "squeeze" of the spring 120 to generate a desired preload or spring force to adequately bias and secure the body 110 against the mating component 102. As shown in FIG. 5, the spring 120 can be exposed beyond the circumferential surface 111 (e.g., an outer diameter of the body 110) proximate the spring portion 112 to interact with the mating component 102 and provide the preload or spring force F. Thus, the spring portion 112 generally represents a region where the spring 120 will interact with the mating component 102 and exert a biasing force against the body 110 (e.g., in the recess 114). Accordingly, in addition to enabling compression of the spring 120, the recess depth 132 at the spring portion 112 can be configured to enable the recess 114 to capture and maintain the spring 120 in a desired position relative to the body 110 and ensure proper function of the spring 120 in biasing the body 110 against the mating component 102.

In one aspect, the depth 132 to a recess bottom 115 can vary relative to the circumferential surface 111 about the body 110. For example, the recess 114 can be eccentrically located relative to the circumferential surface 111. In other words, a geometric center of the recess 114 can be at a location other than at a geometric center of the circumferential surface 111 (i.e., off center). For example, the recess bottom 115 can define a recess axis 134 at a geometric center of the recess bottom 115. The recess 114 (e.g., as defined by the recess bottom 115) can have any suitable shape or configuration about the recess axis 134, as discussed in more detail below. In one aspect, the recess 114 can be circular about the recess axis 134, as shown in FIG. 6, having a recess diameter 135 centered on the recess axis 134. The circumferential surface 111 can define a circumferential surface axis 136 at a geometric center of the circumferential surface 111. The body 110 (e.g., the circumferential surface 111) can have any suitable shape or configuration about the circumferential surface axis 136, as discussed in more detail below. In one aspect, the circumferential surface 111 can be circular about the circumferential surface axis 136, as shown in FIG. 6, having a circumferential surface diameter 137 centered on the circumferential surface axis 136. The eccentric location of the recess 114 relative to the circumferential surface 111 is shown by the recess axis 134 being offset 138 from the circumferential surface axis 136. Thus, the spring 120 can be located about the body 110 in a recess 114 that is eccentrically located with respect to the center of the body 110. Eccentrically locating the recess 114 relative to the circumferential surface 111 can provide the desired depth 132 of the recess 114 at the spring location 112. This can radially expose the spring 120 between the circumferential surface 111 and the mating component 102 to provide spring loading at a defined region (e.g., proximate the spring location 112) between the body 110 and the mating component 102.

Figure 8:
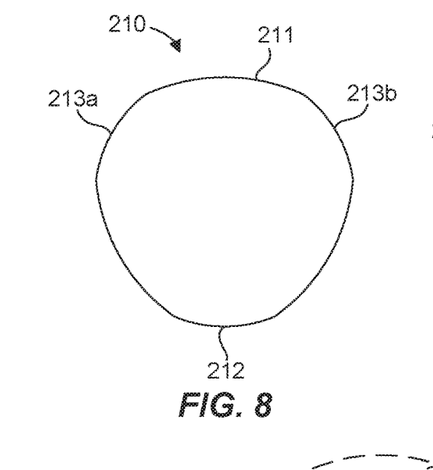
FIG. 8 is an end view of a body of a radial positioning device in accordance with an example of the present disclosure.
Figure 9:
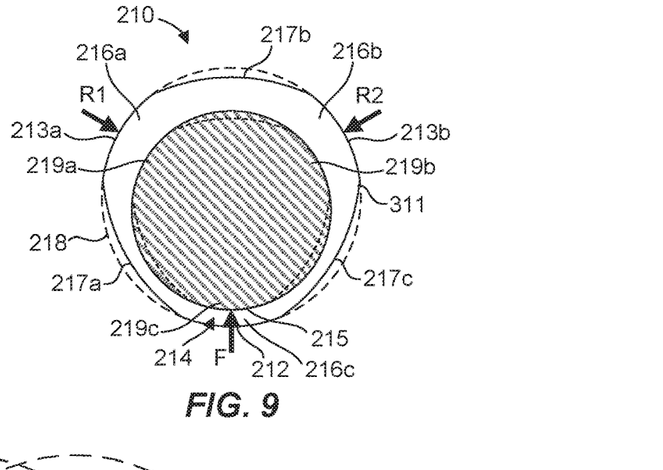
FIG. 9 is a cross-sectional end view of the body of the radial positioning device of FIG. 8, in accordance with an example of the present disclosure.
Figure 11:
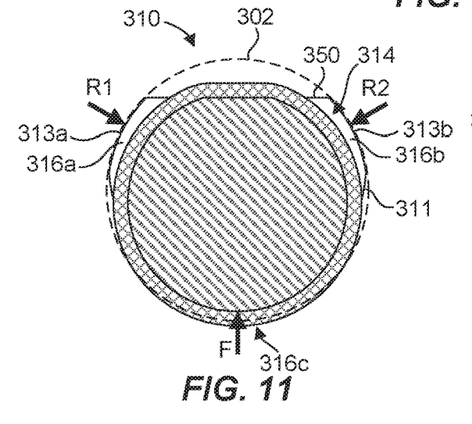
FIG. 11 is a cross-sectional end view of a radial positioning device in accordance with an example of the present disclosure.
Figure 12:
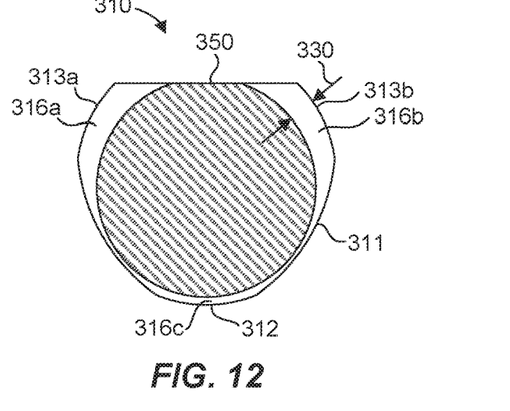
FIG. 12 is a cross-sectional end view of a body of the radial positioning device of FIG. 11.

As mentioned above, a recess (e.g., as defined at least in part by a recess bottom) and a body (e.g., a circumferential surface) as disclosed herein can have any suitable shape or configuration. For example, as shown in FIGS. 8 and 9, a body 210 can have a circumferential surface 211, which can have a spring location 212 and multiple interface portions 213a, 213b operable to interface with a mating component (e.g., the component 102 of FIGS. 1 and 2). In one aspect, the body 210 can have one or more outer lobed portions 216a, 216b that form the respective interface portions 213a, 213b and define the regions where reaction forces R1 and R2 will react a preload or spring force F developed by a spring as described above. An outer lobed portion 216c can also form the spring location 212. FIGS. 11 and 12 illustrate a body 310 with multiple interface portions 313a-c, a spring location 312, and outer lobed portions 316a-c similar to those described herein with respect to FIGS. 8 and 9.

With further reference to FIGS. 8 and 9, the lobed portions 216a-c can be formed by relief portions 217a-c, which represent recessed portions of the circumferential surface 211 from a boundary shape 218 (e.g., a circle or cylinder) that defines the shape of the interface portions 213a, 213b and the spring location 212 of the circumferential surface 211. The lobed portion 216a-c can therefore slightly protrude from the surrounding relief portions 217a-c to define the interface portions 213a, 213b and the spring portion 212. The lobed portions 216a, 216b protruding from the surrounding relief portions 217a-c can form discrete, defined locating features or pads (e.g., the interface portions 213a, 213b) for contacting a mating component (e.g., by simulating multiple "line contacts" with the mating component) to ensure that the preload F provided by a spring at the spring location 212 is reacted at predefined locations on the body 210. The spring force F provided by the spring at the defined spring location 212 can deterministically, radially locate the body 210 against a mating component at the predefined interface portion 213a, 213b locations. The spring can maintain a set amount of preload between the body 210 and the mating component that eliminates any gaps that would allow relative radial motion, which can increase the predictability of the radial position of the body 210 relative to the mating component.

Figure 10:
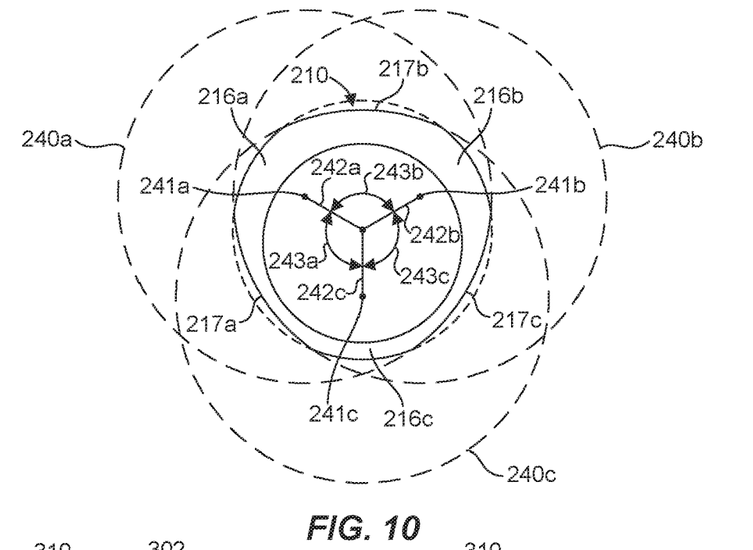
FIG. 10 illustrates forming lobe geometry of the body of the radial positioning device of FIG. 8, in accordance with an example of the present disclosure.

In one aspect, the outer lobed portions 216a-c and relief portions 217a-c can be defined by eccentrically located circles or cylinders 240a-c, as shown in FIG. 10. For example, the circles or cylinders 240a-c can have respective centers or axes 241a-c, which are each eccentrically located from a center axis 217 of the body 210 by respective offsets 242a-c. The centers or axes 241a-c can be angularly spaced from one another about the center axis 217 by angles 243a-c. The offsets 242a-c can be any suitable value and can be the same or different from one another. Similarly, the angles 243a-c can be any suitable value and can be the same or different from one another. It should also be recognized that diameters of the circles or cylinders 240a-c can be any suitable size relative to a diameter of the body 210.

In one aspect, as shown in FIG. 9, a recess 214 in the body 210 can include recess lobed portions 219a-c similar to the outer lobed portions 216a-c, which can facilitate further recessing of a spring (e.g., the spring 120) from the circumferential surface 211. The recess lobed portions 219a-c can serve to avoid potential unwanted contact of the spring with a mating component (e.g., the component 102 of FIGS. 1 and 2) as well as provide increased resistance to spring movement circumferentially about the body 210.

In one aspect, a recess can extend uninterrupted around the entire circumference of a body (as in FIG. 6) or a recess can be interrupted at one or more locations, such as by a "flat" surface formed on a body (e.g., a flat surface 350 in FIGS. 11 and 12). A recess, whether continuous or interrupted, can serve to provide a suitable depth at the spring location as well as an adequate depth greater than the spring thickness to prevent the spring from exerting any biasing force in an undesirable location, such as an interface portion, which would inhibit the ability of a spring to adequately bias a body against a mating component. In one aspect, a circumferential surface can be an outermost surface of a body. As such, a recess can extend away (e.g., inward or outward) from the circumferential surface. In some embodiments, such as where a recess has been interrupted by a "flat" surface formed on a body, a circumferential surface can include the recess-interrupting (e.g., flat) surface.

Although a radial positioning device is shown and described herein as having certain geometries, it should be recognized that the various component, elements, or features of a radial positioning device can have any suitable shape, geometry, etc. (e.g., any shape of body, recess, interface portion, lobed portions, etc.).

In one aspect, a spring can extend about a circumference of a body. For example, as shown in FIG. 4, the spring 120 can extend about the entire circumference or the recess 114. In examples where a recess is interrupted, such as by a flat surface, a spring can extend about the recess and any recess-interrupting surface, such as a flat surface. As shown in FIGS. 11 and 12, even where the spring 320 may be "exposed" due to the local absence of the recess 314 (e.g., the spring 320 on the flat surface 360), the spring 320 may be prevented from contacting a mating component 302 in this area and exerting a spring force on the mating component 302 by the geometry of the circumferential surface 311 and a depth 330 of the recess 314 proximate to the recess-interrupting surface.

Figure 13:
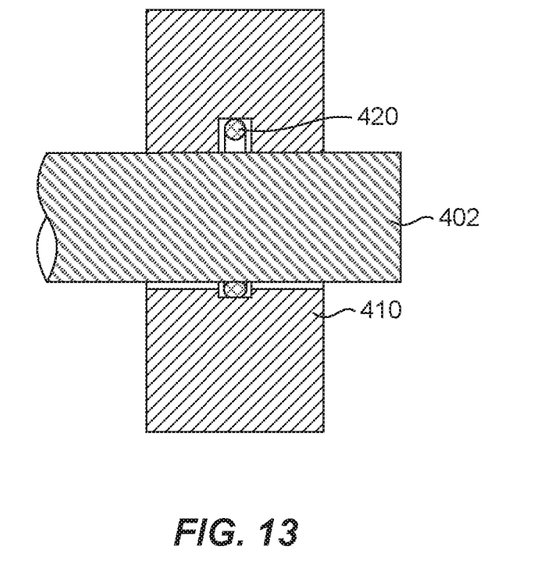
FIG. 13 is an illustration of a radial positioning system in accordance with an example of the present disclosure.
Figure 14:
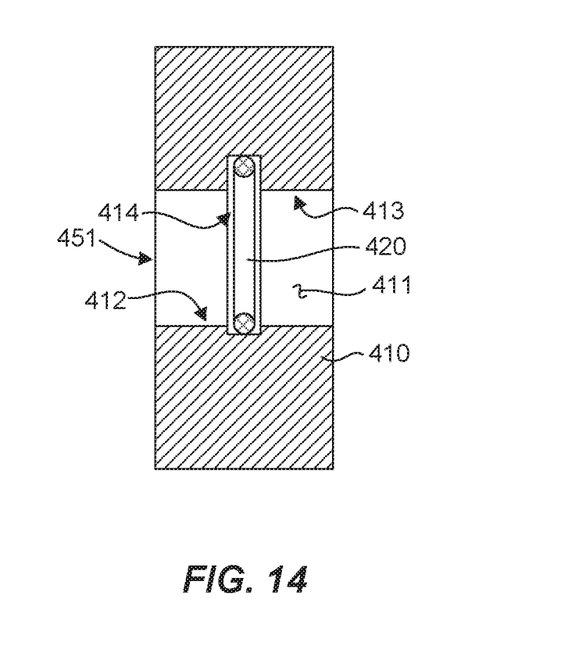
FIG. 14 is a cross-sectional view of a radial positioning device of the radial positioning system of FIG. 13.

Although a body can be configured to fit at least partially within a mating component as described above, it should be recognized as shown in FIGS. 13 and 14, that a body 410 can be configured to fit at least partially over a mating component 402. In this case, a circumferential surface 411 can be an inner surface of the body 410 and a recess 414 can extend outwardly away from the circumferential surface 411. The circumferential surface 411 can define a spring location 412 and one or more interface portions 413 interiorly located in an opening 451 in the body 410. Thus, a spring 420 can be located in an outer support (e.g., the body 410) and can bias an inner mating component 402 toward one or more interiorly oriented interface portions 413. It should be recognized that the body 410 and mating component 402 configuration of FIGS. 13 and 14 can include any suitable feature or aspect of the present technology disclosed herein with respect to an interior body and external mating component (e.g., as in FIGS. 2-12). Thus, for example, the body 410 can include lobed portions, relief portions, etc. as desired to provide multiple interface portions.

In accordance with one example, a method for facilitating radial positioning of mating components is disclosed. The method can comprise obtaining a body having a circumferential surface, the circumferential surface having a spring location and at least one interface portion operable to interface with a mating component, and a recess with a depth that varies relative to the circumferential surface about the body. Additionally, the method can comprise disposing a spring in the recess, the spring having a radial dimension greater than the depth of the recess at the spring location, wherein the spring is operable to contact the mating component at the spring location and compress in the radial dimension to provide a spring force to facilitate biasing the at least one interface portion and the mating component against one another. In one aspect, the recess can be eccentrically located relative to the circumferential surface. It is noted that no specific order is required in this method, though generally in one embodiment, these method steps can be carried out sequentially.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Although the disclosure may not expressly disclose that some embodiments or features described herein may be combined with other embodiments or features described herein, this disclosure should be read to describe any such combinations that would be practicable by one of ordinary skill in the art. The use of "or" in this disclosure should be understood to mean non-exclusive or, i.e., "and/or," unless otherwise indicated herein.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A radial positioning device, comprising:
a body having
a circumferential surface, the circumferential surface having a spring location and one or more outer lobed portions that form at least one interface portion operable to interface with a mating component, and
a recess with a depth that varies relative to the circumferential surface about the body; and
a spring disposed in the recess and having a radial dimension greater than the depth of the recess at the spring location,
wherein the spring extends about an entire circumference of the recess and the spring is recessed below the circumferential surface outside the spring location,
wherein the spring is operable to contact the mating component at the spring location and compress in the radial dimension to provide a spring force that biases the at least one interface portion and the mating component against one another, and
wherein the body is movable relative to the mating component in an axial direction.

2. The radial positioning device of claim 1, wherein the recess is circular.

3. The radial positioning device of claim 1, wherein the recess is eccentrically located relative to the circumferential surface.

4. The radial positioning device of claim 1, wherein the at least one interface portion comprises two interface portions.

5. The radial positioning device of claim 1, wherein the body comprises at least one of an axle or a trunnion.

6. The radial positioning device of claim 1, wherein the circumferential surface is at least one of an outer surface of the body and the body is configured to fit at least partially within the mating component, or an inner surface of the body, wherein the body is configured to fit at least partially over the mating component.

7. The radial positioning device of claim 1, wherein the spring comprises at least one of a circular spring, a circumferential spring, a toroidal spring, a garter spring, a coil spring, a meander spring, a cantilever spring, a radial spring, or a sealing ring.

8. The radial positioning device of claim 1, wherein a cross-sectional shape of the spring comprises a circle, a square, a rectangle, a V-shape, a U-shape, or an X-shape.

9. The radial positioning device of claim 1, wherein the spring comprises at least one of an elastomer or a metal.

10. The radial positioning device of claim 1, wherein the spring comprises an O-ring.

11. A radial positioning system, comprising:
a component; and
a radial positioning device operable to couple with the component, the radial positioning device comprising
a body having:
a circumferential surface, the circumferential surface having a spring location and one or more outer lobed portions that form at least one interface portion operable to interface with the component, and
a recess with a depth that varies relative to the circumferential surface about the body; and
a spring disposed in the recess and having a radial dimension greater than the depth of the recess at the spring location,
wherein the spring extends about an entire circumference of the recess and the spring is recessed below the circumferential surface outside the spring location,
wherein the spring is operable to contact the component at the spring location and compress in the radial dimension to provide a spring force that biases the at least one interface portion and the component against one another, and
wherein the body is movable relative to the component in an axial direction parallel to an axis.

12. The system of claim 11, wherein the body is associated with a rotatable structure, and the component is associated with a support for the rotatable structure, and wherein the rotatable structure is rotatable relative to the support about the axis.

13. The system of claim 12, wherein the at least one interface portion and the spring interface the radial positioning device with the component at a first location, and the rotatable structure and the support are fixed in the axial direction relative to one another at a second location.

14. The system of claim 13, wherein the rotatable structure and the support are fixed in a radial direction relative to one another at the second location.

15. The system of claim 11, wherein the circumferential surface is an outer surface of the body and the body is configured to fit at least partially within the component, or the circumferential surface is an inner surface of the body and the body is configured to fit at least partially over the component.

16. A method for facilitating radial positioning of mating components, comprising:
obtaining a body having
a circumferential surface, the circumferential surface having a spring location and one or more outer lobed portions that form at least one interface portion operable to interface with a mating component for the body, and
a recess with a depth that varies relative to the circumferential surface about the body; and
disposing a spring in the recess, the spring having a radial dimension greater than the depth of the recess at the spring location,
wherein the spring extends about an entire circumference of the recess and the spring is recessed below the circumferential surface outside the spring location,
wherein the spring is operable to contact the mating component at the spring location and compress in the radial dimension to provide a spring force to facilitate biasing the at least one interface portion and the mating component against one another, and
wherein the body is movable relative to the component in an axial direction.

17. The method of claim 16, wherein the recess is eccentrically located relative to the circumferential surface.

* * * * *